US008832105B2

(12) United States Patent
Punera et al.

(10) Patent No.: US 8,832,105 B2
(45) Date of Patent: Sep. 9, 2014

(54) SYSTEM FOR INCREMENTALLY CLUSTERING NEWS STORIES

(75) Inventors: Kunal Punera, Santa Clara, CA (US); Suju Rajan, Sunnyvale, CA (US); Choon Hui Teo, Sunnyvale, CA (US); Srinivas Vadrevu, Milpitas, CA (US)

(73) Assignee: Yahoo! Inc., Sunnyvale, CA (US)

( * ) Notice: Subject to any disclaimer, the term of this patent is extended or adjusted under 35 U.S.C. 154(b) by 145 days.

(21) Appl. No.: 13/117,022

(22) Filed: May 26, 2011

(65) Prior Publication Data
US 2012/0303623 A1 Nov. 29, 2012

(51) Int. Cl.
*G06F 7/00* (2006.01)
*G06F 17/30* (2006.01)

(52) U.S. Cl.
USPC ............................................. 707/737

(58) Field of Classification Search
USPC ............................................. 707/737
See application file for complete search history.

(56) References Cited

U.S. PATENT DOCUMENTS

2008/0205775 A1* 8/2008 Brinker et al. ............... 382/225
2009/0070346 A1* 3/2009 Savona et al. ............... 707/100

FOREIGN PATENT DOCUMENTS

EP 1965315 A1 * 9/2008

OTHER PUBLICATIONS

U.S. Appl. No. 13/099,197, filed May 2, 2011, Vadrevu.
Ailon, N., et al. "Aggregating Inconsistent Information: Ranking and Clustering," *STOC*, pp. 684-693, 2005 (10 Pages).
Aslam, J.A., et al. "The Star Clustering Algorithm for Static and Dynamic Information Organization," *Journal of Graph Algorithms and Applications*, 8(1):95-129, 2004 (35 Pages).
Bilenko, M., et al. "Integrating Constraints and Metric Learning in Semi-Supervised Clustering," *ICML*, pp. 81-88, 2004 (8 Pages).
Blei, D.M. "Variational Methods for the Dirichlet Process," *In Proceedings of the 21st International Conference on Machine Learning*, 2004 (8 Pages).
Blei, D.M., et al. "Latent Dirichlet Allocation," *Journal of Machine Learning Research*, 3:2003, 2002 (30 Pages).
Brill, E. "A Simple Rule-Based Part of Speech Tagger," *ANLP*, pp. 152-155, 1992 (5 Pages).
Broder, A. Z., et al. "Syntactic Clustering of the Web," *Comput. Netw. ISDN Syst.* 29(8-13):1157-1166, 1997 (13 Pages).

(Continued)

*Primary Examiner* — James Trujillo
*Assistant Examiner* — Jeffrey Chang
(74) *Attorney, Agent, or Firm* — Weaver Austin Villeneuve & Sampson LLP

(57) ABSTRACT

Disclosed are methods and apparatus for clustering news stories, which are to be presented over a computer network. In general, an incremental clustering system is configured to update a current set of news clusters with newly arrived news articles without having to recompute the clusters for the entire corpus, as well as form new clusters for recently generated news topics. In one embodiment, a plurality of news articles are initially obtained via the computer network, and the news articles are clustered into a plurality of initial clusters. For only news articles, including any unclustered news articles, that are less than a predetermined age limit, it is determined in an incremental clustering process whether to form one or more new clusters or assign to the initial clusters. Indications of the initial clusters and the one or more new clusters, if any, are then stored so as to be accessible for sending a portion of the news articles to users in a clustered format based on the initial clusters and the one or more new clusters, if any.

20 Claims, 5 Drawing Sheets

(56) References Cited

OTHER PUBLICATIONS

Charikar, M.S. "Similarity Estimation Techniques From Rounding Algorithms," *STOC '02: Proceedings of the Thirty-Fourth Annual ACM Symposium on Theory of Computing*, pp. 380-388, 2002 (9 Pages).

Chu, C.-T. K., et al. "Map-Reduce for Machine Learning on Multicore," pp. 281-288, 2007 (8 Pages).

Dean, J., et al. "Mapreduce: Simplified Data Processing on Large Clusters," *Commun. ACM*, 51(1):107-113, 2008 (13 Pages).

Fan, R.-E., et al. "Liblinear: A Library for Large Linear Classification," *J. Mach. Learn. Res.*, 9:1871-1874, 2008 (29 Pages).

Finley, T., et al. "Supervised Clustering with Support Vector Machines," *ICML '05: Proceedings of the 22nd International Conference on Machine Learning*, pp. 214-224, 2005 (8 Pages).

Foundation, A. "Apache Hadoop Project," lucene.apache.org/hadoop (3 Pages).

Foundation, A. "Apache Mahout Project," mahout.apache.org (4 Pages).

Foundation, A. "Dirichlet Process Clustering," https://cwiki.apache.org/MAHOUT/dirichlet-process-clustering.html (11 Pages).

Gionis, A., et al. "Similarity Search in High Dimensions Via Hashing," *VLDB '99: Proceedings of the 25th International Conference on Very Large Data Bases*, pp. 518-529, 1999 (12 Pages).

Ishwaran, H., et al. "Gibbs Sampling Methods for Stick-Breaking Priors." (13 Pages).

Lin, J. "Divergence Measures Based on the Shannon Entropy," *IEEE Transactions on Information Theory*, 37:145-151, 1991 (7 Pages).

Liu, J., et al. "Personalized News Recommendation Based on Click Behavior," *IUI '10: Proceeding of the 14th International Conference on Intelligent User Interfaces*, pp. 31-40, 2010 (10 Pages).

McCallum, A., et al. "Efficient Application to Reference Matching," 2000 (10 Pages).

Rahimi, A., et al. "Random Features for Large-Scale Kernel Machines," *In Neural Information Processing Systems*, 2007 (10 Pages).

Ravichandran, D., et al. "Randomized Algorithms and NLP: Using Locally Sensitive Hash Functions for High Speed Noun Clustering," *In Proceedings of Association for Computational Linguistics*, pp. 622-629, 2005 (8 Pages).

Schultz, M., et al. "Learning a Distance Metric From Relative Comparisons," *Advances in Neural Information Processing Systems (NIPS)*. MIT Press, 2003 (8 Pages).

Smola, A., et al. "An Architecture for Parallel Topic Models," *Very Large Databases (VLDB)*, 2010 (8 Pages).

Haveliwala, P.I. Taher H., et al. "Scalable Techniques for Clustering the Web," *In Proc. of the WebDB Workshop*, pp. 129-134, 2000 (6 Pages).

Wagstaff, K., et al. "Constrained K-Means Clustering with Background Knowledge," *In ICML*, pp. 577-584. Morgan Kaufmann, 2001 (8 Pages).

Xing, E.P., et al. "Distance Metric Learning, with Application to Clustering with Side-Information," *Advances in Neural Information Processing Systems 15*, pp. 505-512. MIT Press, 2002 (8 Pages).

Zadrozny, B., et al. "Transforming Classifier Scores Into Accurate Multiclass Probability Estimates," *Proc. of the 9th ACM SIGKDD International Conference on Knowledge Discovery and Data Mining*, pp. 694-699, 2002 (6 Pages).

\* cited by examiner

SYSTEM FOR INCREMENTALLY CLUSTERING NEWS STORIES

BACKGROUND OF THE INVENTION

The present invention is related to techniques and mechanisms for managing news stories that are delivered via a computer network.

People are increasingly obtaining news stories on-line, for example, from Internet sources. One source of news stories is Yahoo! News Search that allows users to search for specific news topics. In this search application, news stories are grouped by topic.

SUMMARY OF THE INVENTION

Improved apparatus and methods for clustering news stories, which are to be presented over a computer network, are disclosed. In general, an incremental clustering system is configured to update a current set of news clusters with newly arrived news articles without having to recompute the clusters for the entire corpus, as well as form new clusters for recently generated news topics. In one embodiment, a plurality of news articles are initially obtained via the computer network, and the news articles are clustered into a plurality of initial clusters. For only news articles, including any unclustered news articles, that are less than a predetermined age limit, it is determined in an incremental clustering process whether to form one or more new clusters or assign to the initial clusters. Indications of the initial clusters and the one or more new clusters, if any, are then stored so as to be accessible for sending a portion of the news articles to users in a clustered format based on the initial clusters and the one or more new clusters, if any.

In a specific implementation, the predetermined age limit is about four hours. In another aspect, the news articles that are less than a predetermined age limit are defined as transient articles and the remaining news articles are defined as fixed articles. In this aspect, the incremental clustering is withheld from being performed on the fixed articles so that the fixed articles retain their initial cluster memberships. In a specific embodiment, the incremental clustering process is performed by (i) for each transient article, finding one or more nearest neighbor articles from the entire corpus of articles, including fixed and transient articles, (ii) for each transient article selected from a randomly ordered set, determine whether a ratio of nearest neighbors that are fixed articles to nearest neighbors that are transient articles is greater than a predetermined threshold, (iii) and for each transient article selected from the randomly ordered set and based on the determination as to whether the ratio is greater than the predetermined threshold, adding such transient article and its one or more nearest neighbors that are transient articles to one or more of the initial clusters or forming a new cluster for such transient article and its one or more nearest neighbors that are transient articles.

In a specific example, one or more nearest neighbors are found for each transient article using a locality sensitive hashing technique. In another embodiment, the incremental clustering process further includes removing each transient article and its nearest neighbors from the randomly ordered set of news articles prior to clustering a next transient article from such randomly ordered set. In a further aspect, the entire corpus of news articles are recursively re-clustered so as to find a lowest cost clustering after a predetermined time period.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of certain embodiments of the invention and the accompanying figures which illustrate by way of example the principles of the invention.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that they are not intended to limit the invention to one embodiment. On the contrary, they are intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
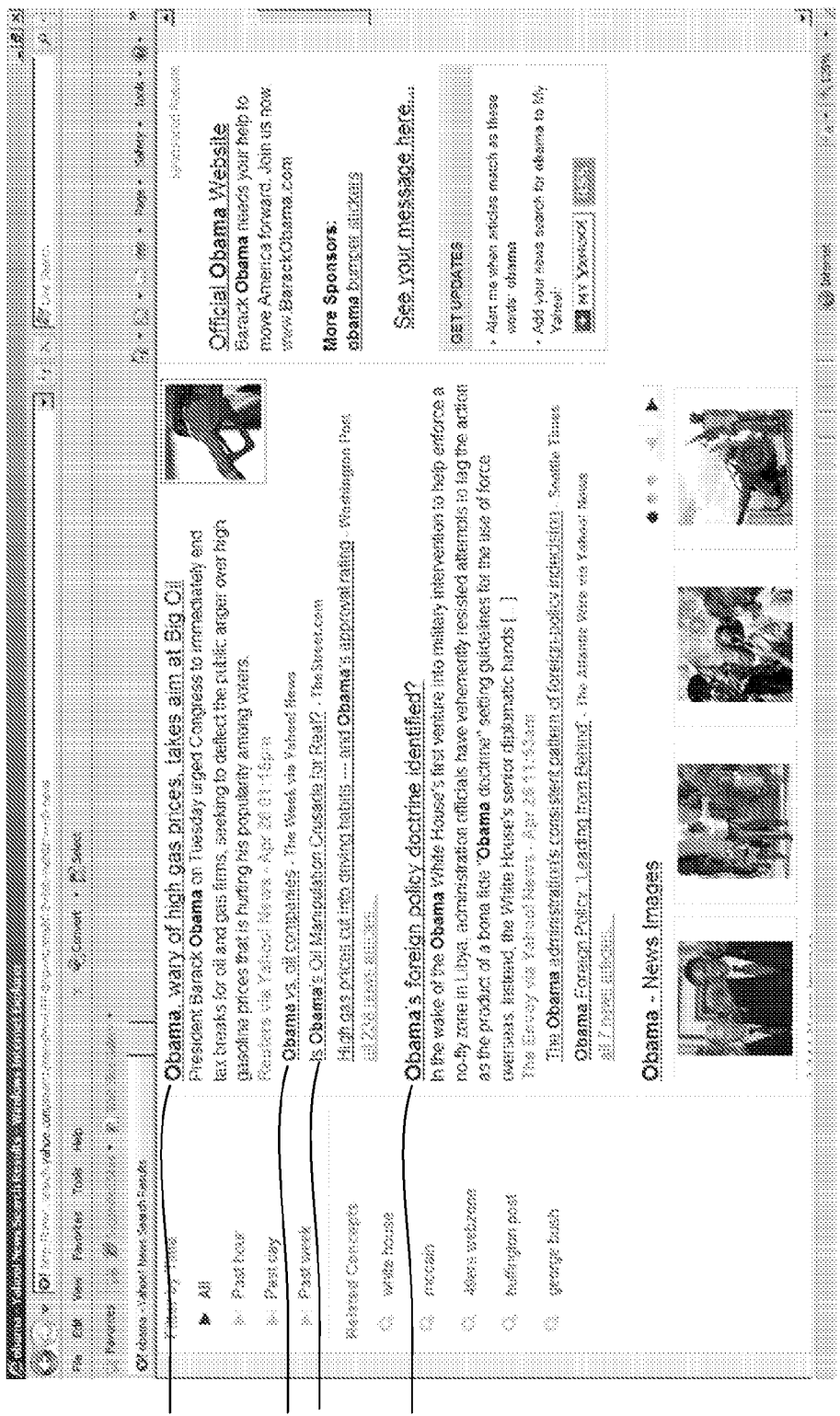
FIG. 1 is a screen shot of an example application of news clustering.

FIG. 1 is a screen shot 100 of an example application of news clustering. When a user performs a search for news stories, the search results may take the form of news stories that are presented in a news group format as shown in the illustrated example. For instance, a search on the keyword "Obama" may result in news groups that include a news group 102a pertaining to President Obama being "wary of high gas prices, takes aim at Big Oil" and a news group 102b relating to the question of whether President "Obama's foreign policy doctrine [is] identified". In this example, each news group includes a top news story (e.g., by Reuters and The Envoy, respectively, via Yahoo! news) and a plurality of other related stories. For instance, the first group 102a includes a story 104a from The Week and a story 104b from TheStreet.com.

Prior to presenting news stories in groups or clusters, a news story clustering technique is first performed on the corpus of news stories. One news clustering technique may utilize an approach in which an initial news story is first randomly selected. It is then determined which one or more stories are closest to this first initial story based on a selected set of story factors, such as the specific words or phrases used in the stories. This determination process is then repeated on another randomly selected news stories. This process continues to be applied to the entire news corpus until the news stories are all analyzed, resulting in clustering of news stories.

A clustering process that uses seed articles will have an outcome that depends on which stories were picked first (e.g., seed group). In some cases, related news stories may be accidentally split into different clusters or two unrelated news articles may be mistakenly joined in the same cluster if particular "bad" seed groups are chosen. To minimize this problem, the entire clustering process can be repeated for different seed groups so as to find the best cluster results. However, this repetitive process takes a significant amount of time, e.g., hours, which is a problem for users who want to view their breaking news as quickly as possible without significant delays.

In general terms, certain embodiments of the present invention provide techniques in which newer stories are more efficiently grouped into new breaking stories without spending significant amounts of time analyzing the entire article corpus. As an example application, President Obama is visiting Palo Alto over several days. As a result of these activities, news stories on the President's visit are generated and obtained by various news aggregation services (e.g., an online news service provider, such as Yahoo! News). If a significant event occurs during the second day of the President's visit, these new activities may continue to be grouped with yesterday's stories about the visit, rather than forming a new cluster about the new event, even when a significantly new event has occurred with respect to the President's visit. For example, if the President discusses a specific, topic of interest, such as decreasing the demand for foreign oil, news readers may wish to see this topic grouped separately and not mixed in with all of the stories pertaining to the general topic of the President's visit.

Since breaking stories will tend to result in multiple stories being generated over a short time period, certain inventive techniques provide incremental clustering techniques for stories that are generated within a time frame that is long enough to result in multiple stories on a breaking topic and short enough to not group stories that are likely to be related. In certain embodiments, stories that fall within a predetermined time window (e.g., 1 hour or 4 hours) may be reanalyzed to determine whether such newer stories should remain in their old clusters or be broken out into one or more new clusters. The clustering decisions for particular stories are revisited within a specific time window as described further below. As stories fall outside the specific time window (e.g., become too old), the clustering decision for such story is not revisited so as to form new clusters.

Such an incremental clustering technique may be implemented in any suitable manner. In the following examples, news articles are clustered together based on similarity in word content and the example implementation is well suited for this purpose. However, if the goal is to group news articles based on the people who are described in the stories, other clustering techniques may be used. Other ways to define news stories may include place, events, time, named entities, topic models, etc. That is, although embodiments are described herein with respect to a specific clustering process, any clustering process may be utilized to group news articles together. Additionally, the techniques of the present invention may be applied to other types of objects, besides news articles.

Examples of clusterable objects include web documents, research papers, photographs, videos, tweets, RSS feeds, etc.

Figure 2:
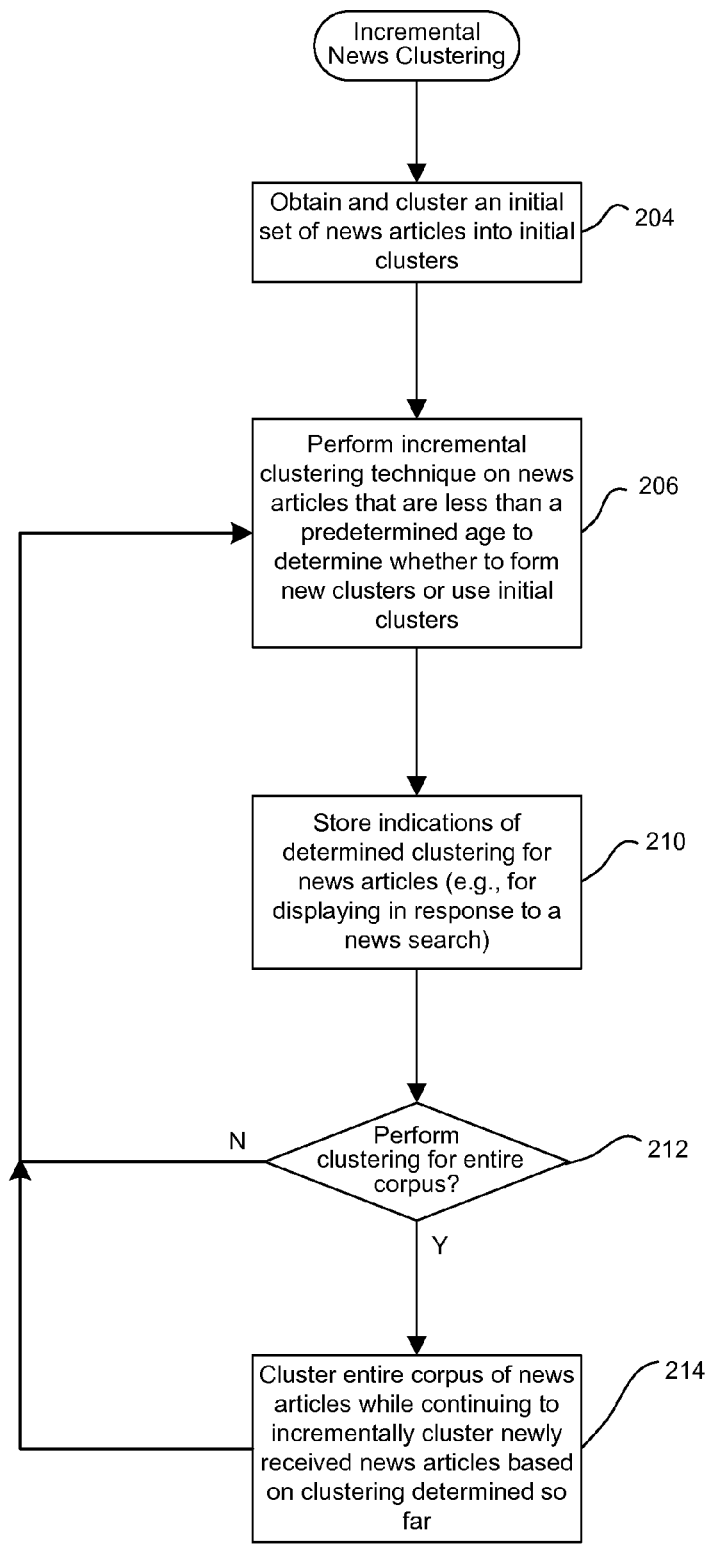
FIG. 2 is a flow chart illustrating a general overview of an incremental news clustering process in accordance with a specific implementation of the present invention.

FIG. 2 is a flow chart illustrating a general overview of an incremental news clustering process 200 in accordance with a specific implementation of the present invention. As shown in the illustrated example, an initial set of news articles is obtained and clustered into an initial set of clusters in operations 204. The incremental clustering techniques described herein are performed with respect to an article corpus that has already been initially clustered (e.g., over time using incremental techniques and/or using full clustering techniques on the entire corpus). This initial set of clusters may be obtained using any suitable clustering technique. For example, an offline Locality Sensitive Hashing technique may be implemented on the entire article corpus as further described below.

An incremental clustering technique may then be performed on news articles that are less than a predetermined age threshold to determine whether to form news clusters or use the initial clusters in operation 206. The predetermined age threshold may be selected by observing the rate of inflow of different types of news stories into the corpora over which clustering is to be implemented or estimating the lifetime of news stories by other means. In one example, the threshold is about 4 hours. In this example, news articles that are generated within a 4 hour window are assessed so as to determine whether they belong to an old cluster or whether some of the stories should be grouped into a new cluster as part of a new breaking story topic (or multiple new clusters on multiple breaking stories).

Indications of the determined clustering for the news articles (initial and new clustering) are then stored in operation 210. For example, each article is associated with a cluster identifier (e.g., in a database) for later access by a news search engine. Thus, when a user performs a news search, news article results can be formatted into groups based on their respective cluster identifiers.

Figure 3:
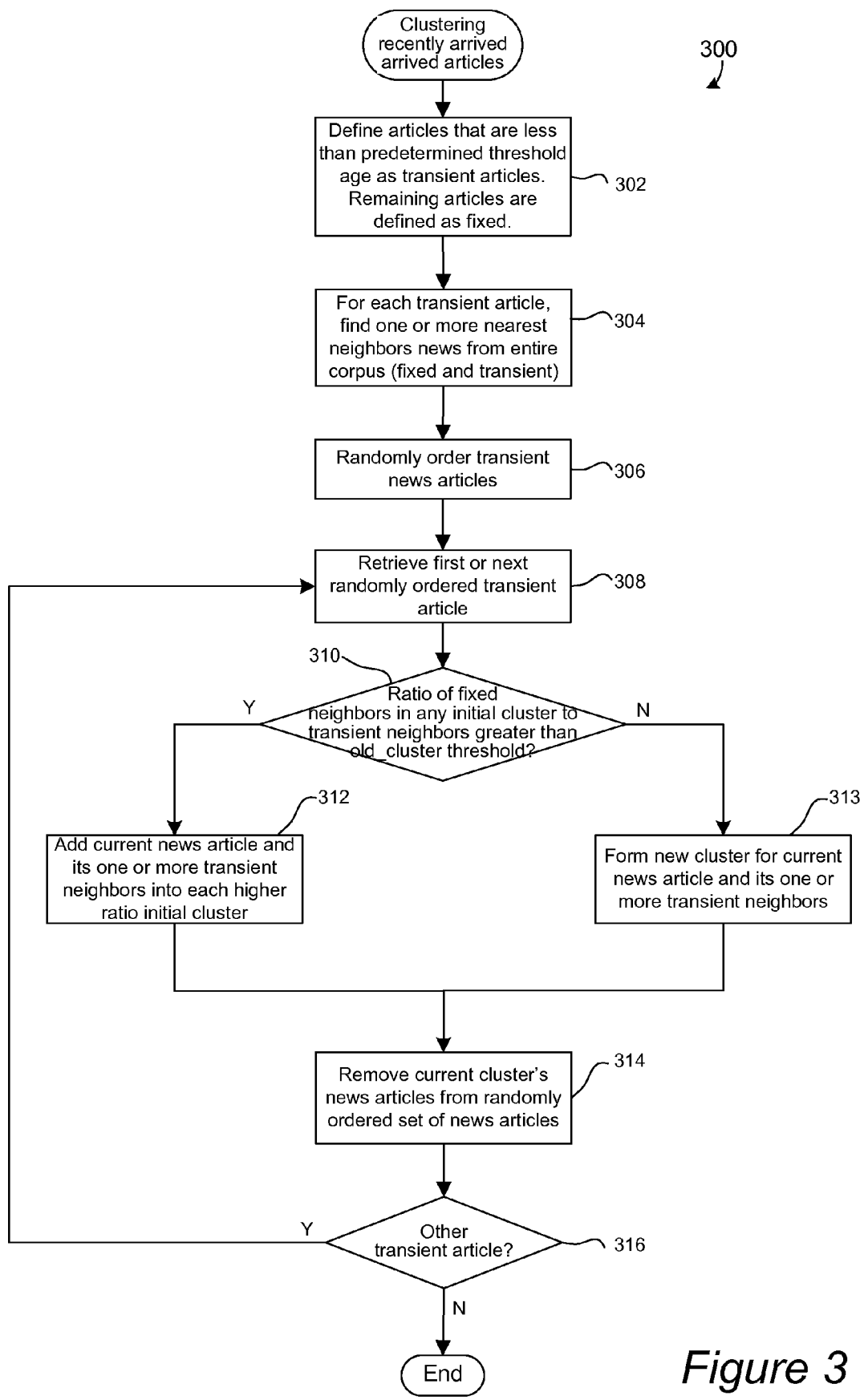
FIG. 3 is a flow chart illustrating a detailed example of an incremental clustering procedure in accordance with one embodiment.

FIG. 3 is a flow chart illustrating a detailed example of an incremental clustering procedure 300 in accordance with one embodiment. As shown, articles that are less than the predetermined age threshold are defined as transient articles and the remaining articles are defined as fixed articles in operation 302. In effect, only newer articles will be assessed for forming new clusters.

For each transient article, one or more nearest neighbor articles are found from the entire corpus (i.e., fixed and transient articles) in operation 304. The nearest neighbors for a particular news article may be found in any suitable manner. In one example, a Locality Sensitive Hashing (LSH) technique may be used. This technique works well for finding documents based on word or phrase commonality. Overall, the accuracy of the clustering appears to be high enough, e.g., to satisfy users.

An LSH technique can perform nearest neighbor computations over a relatively short time frame. In general, random phrases are selected for each document to be used to determine similarity between documents. It has been found that the most important phrases are most likely to be randomly selected since the most important phrases tend to have a high frequency within the document. Thus, the LSH technique does not compare every word in the articles nor does the LSH technique perform an analysis to determine which phrases are most important. Thus, random selection of phrases for the nearest neighbor analysis is a lot faster than other techniques which use all articles words or determine which phrases are most important.

After nearest neighbors are found for the transient articles, they may be randomly ordered and the first transient article in the ordered list is then retrieved in operations 306 and 308, respectively. It may then be determined whether the ratio of fixed neighbors in any one initial cluster to the transient neighbors is greater than a predetermined threshold in operation 310. This determination may be applied to each of the different initial clusters of the fixed neighbor article set of the currently selected transient news article (if a transient article has fixed neighbors from more than one initial cluster). In another implementation, the criteria to assign a node and its neighbors to an initial cluster C is to determine if the ratio of nearest neighbors that are fixed articles and assigned to the same initial cluster C to all other nearest neighbors (transient+ fixed and assigned to some other initial cluster) is greater than some threshold.

In general, it is determined whether there are significantly more older (fixed) nearest neighbor articles for any one initial cluster than newer (or transient) nearest neighbor articles for the currently selected transient article. If a ratio of older to newer articles is greater than the threshold, then the current news article and its one or more transient neighbors (if any) are added to each higher ratio initial cluster in operation 312. This example implementation includes the possibility of assigning each current news article to multiple initial clusters. However, a "greedy" correlation clustering algorithm may be used so that the current transient article becomes a member of only the best initial cluster.

On the other hand, if the ratio of fixed nearest neighbors in any one initial cluster to transient nearest neighbors is not greater than the predetermined threshold, a new cluster is formed for the current news article and its plurality of transient neighbors in operation 313. For example, a new cluster identifier is formed for the current article and its transient nearest neighbors. As a result, a new cluster is only formed when a fairly recent set of similar articles are generated as compared to similar older articles.

Whether the current article and its transient neighbors are added to an old cluster or a new cluster is formed, the current cluster's news articles and its nearest neighbors are removed from the ordered set of transient news articles in operation 314. It is then determined whether there are any other transient articles in the ordered list in operation 316. If not, the incremental clustering process 300 ends. If there are more transient articles in the ordered list, the next transient article is retrieved from the ordered list and the new or old cluster determination operations (e.g., operations 310-314) are repeated. The process ends after all of the ordered transient articles are analyzed for cluster membership.

Several techniques and systems for performing an offline clustering technique, e.g., using LSH, are described further in U.S. patent application Ser. No. 13/099,197, filed 2 May 2011, title "UTILIZING OFFLINE CLUSTERS FOR REALTIME CLUSTERING OF SEARCH RESULTS" by Srinivas Vadrevu et al., which application is incorporated herein by reference in its entirety for all purposes.

This incremental process has been found to result in a fairly low number of mistakes (with respect to cluster) in the long run. In the short run, randomly clustered stories may be generated. However, it appears that a typical user is more interested in receiving timely news articles and is willing to tolerate a few mistakes in the clustering of articles as viewed by the user. Overall, embodiments of this procedure allow a user to mostly view new stories together when there is a new topic of breaking news. This result is in contrast to viewing disjointed clustering of new stories with outdated stories.

Although an incremental technique for clustering news articles (or the like) works well in most situations, over time mistakes in the clustering may start to accumulate. Accordingly, other clustering options may be used with the incremental techniques so as to more rigorously "reset" the clustering of the entire corpus. Referring back to FIG. 2, it may also be determined whether clustering is to be performed on the entire corpus in operation 212. The trigger for reassessing the entire corpus' clustering may be based on any suitable factors, such as time, accuracy metrics, etc. In one implementation, the entire corpus is reevaluated for clustering every predefined time period, such as every four hours. There is no restriction for when to perform full clustering. For instance, full clustering may be performed every hour and allow fixed articles to move around and such movement may overlap with the transient window (e.g., full cluster movement may occur every 1 hour and occurs within a four hour transient window for incremental clustering). If such full clustering is to be performed (e.g., 4 hours have passed), the entire corpus is then clustered in operation 214. After full clustering, incremental clustering may be performed based on the entire corpus' new clustering in operation 206.

During full clustering of the entire corpus, incremental clustering of newly received articles is preferably continued. While the clustering of the entire corpus is being reassessed and possible altered, the incremental clustering may be based on the corpus' clustering settings that were present prior to such full reclustering. That is, the clustering settings may be saved prior to performing a full clustering so that incremental clustering can continue without interruption. Alternatively, incremental clustering may be implemented on the current settings of the corpus clustering as it is changed by the full clustering. That is, if an article has yet to be reclustered in a full clustering procedure, its current cluster is used for incremental clustering of new articles. In contrast, as articles are reclustered, the incremental clustering can instead be based on such new clusters.

Full clustering may be performed using any suitable technique, such as using LSH and correlation clustering to reassess the clustering of all articles. Other full clustering techniques include any of the standard clustering algorithms such as k-means, agglomerative clustering or graph-based clustering methods, etc. In specific techniques, the full clustering technique may utilize a seed set of articles for clustering of the remaining corpus. Different seed articles are used, and the results are assessed to determine the best clustering. For example, the cost of each clustering result is determined and the clustering that has the minimum cost is used. In a specific implementation, when an article changes its cluster (e.g., leaves or joins a cluster), a cost may be associated with such clustering outcome. Such costs are summed for all similar cluster movements for a particular clustering execution. The cluster results with the lowest total costs are then utilized. Other techniques for determining minimum cost may be utilized in the full clustering process.

Figure 4:
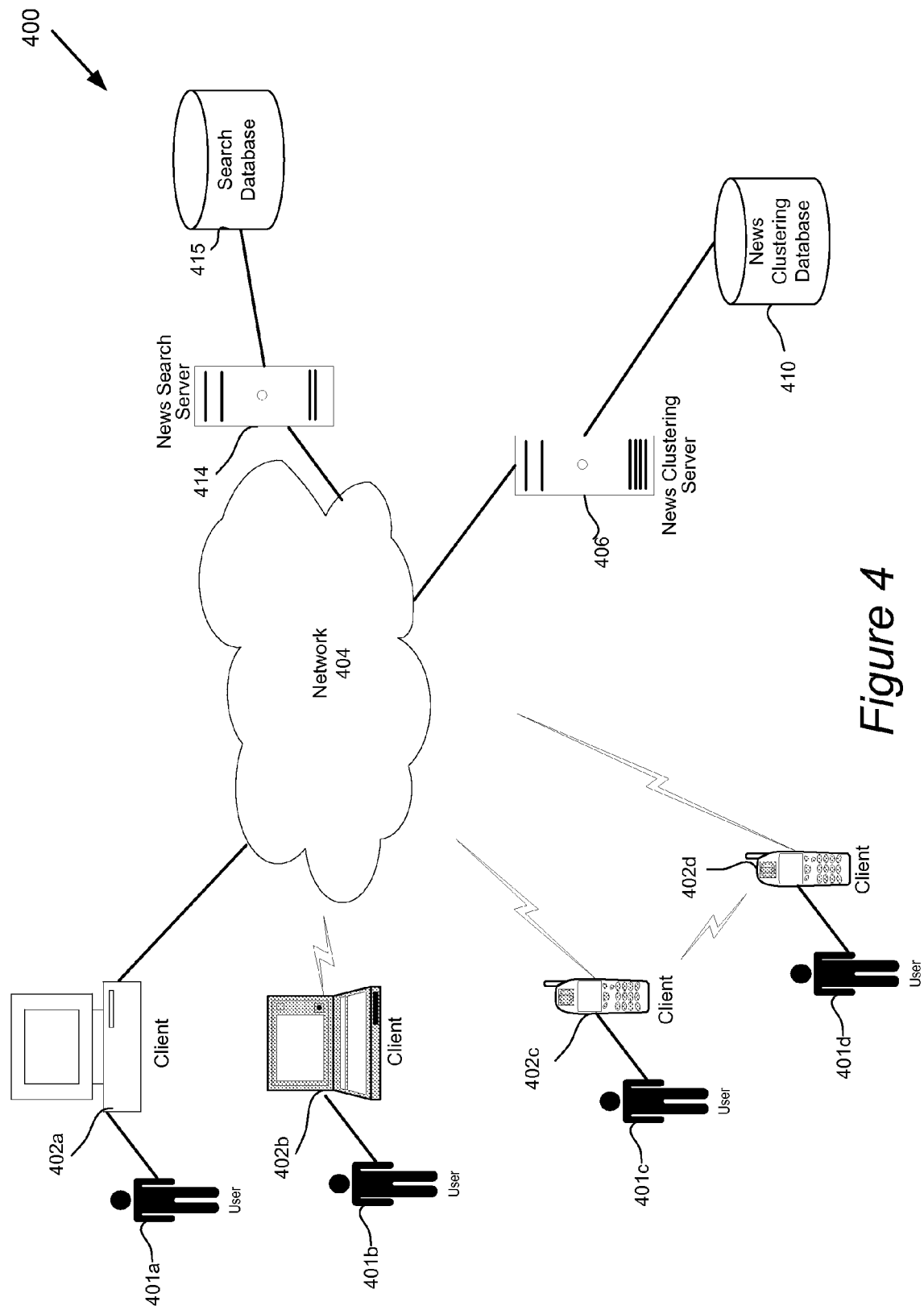
FIG. 4 illustrates an example network segment in which the present invention may be implemented in accordance with one embodiment of the present invention.

A network architecture will now be briefly described to provide an example context for practicing techniques of the present invention. FIG. 4 illustrates an example network segment 400. As shown, a plurality of users 401a-d through clients 402a~d may access news articles using various news search servers, such as server 414, via network 404. Although not shown, other types of news aggregation services that can be utilized by users may also be implemented by various servers. News applications may be implemented on any number of servers although only one news search server 414 is illustrated for clarity and simplification of the description. Each server (e.g., 414) may have access to one or more database(s) (e.g., 415) into which news or news search information is retained.

The network may take any suitable form, such as a wide area network or Internet and/or one or more local area networks (LAN's), The network 404 may include any suitable number and type of devices, e.g., routers and switches, for forwarding requests from each client to a particular server application, forwarding application results back to the requesting clients, or forwarding data between various servers.

Embodiments of the present invention may also be practiced in a wide variety of network environments (represented by network 404) including, for example, TCP/IP-based networks (e.g., Rate Control Protocol or RCP, Transport Control Protocol or TCP, Fast TCP, Stream-based TCP/IP or STCP, eXplicit Control Protocol or XCP, etc.), telecommunications networks, wireless networks, mobile networks, etc, In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be affected or employed at different locations.

A news server may take any suitable form for providing news search services. In one implementation, a news search server generally allows a user (human or automated entity) to communicate with a server via a communication device (e.g., telephones, persona digital assistants or PDA's, computers, etc.) via one or more networks (e.g., 404) and retains search information, for example, in database 415.

Embodiments of the present invention may be employed with respect to news data obtained from news server applications or generated from any document management application. Embodiments of the present invention may include news clustering server 406 for analyzing and clustering news articles. The news clustering server 406 may be implemented within another application server, such as a news search server 414, or on one or more separate servers, such as the illustrated news clustering server 406. In general, a news clustering server can be configured to analyze various news articles (or the like) based on clustering techniques described herein. The news clustering server 406 may access one or more analysis databases, e.g., database 410, for storing representational information regarding news articles, clustering, etc.

Figure 5:
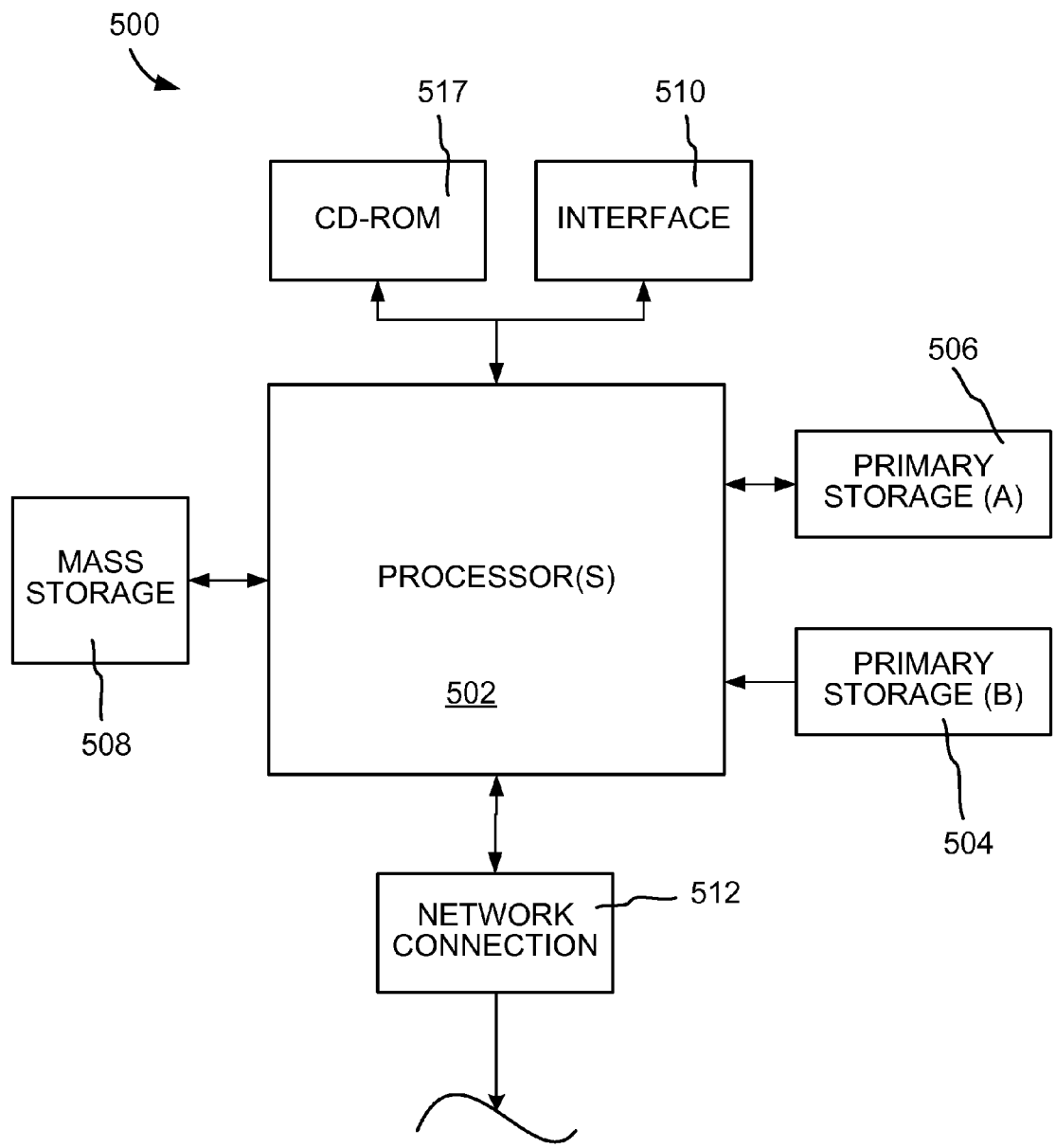
FIG. 5 illustrates an example computer system in which specific embodiments of the present invention may be implemented.

FIG. 5 illustrates a typical computer system that, when appropriately configured or designed, can serve as an incremental clustering system. The computer system 500 includes any number of processors 502 (also referred to as central processing units, or CPUs) that are coupled to storage devices including primary storage 506 (typically a random access memory, or RAM), primary storage 504 (typically a read only memory, or ROM). CPU 502 may be of various types including microcontrollers and microprocessors such as programmable devices (e.g., CPLDs and FPGAs) and unprogrammable devices such as gate array ASICs or general-purpose microprocessors. As is well known in the art, primary storage 504 acts to transfer data and instructions uni-directionally to the CPU and primary storage 506 is used typically to transfer data and instructions in a bi-directional manner. Both of these primary storage devices may include any suitable computer-readable media such as those described herein. A mass storage device 508 is also coupled bi-directionally to CPU 502 and provides additional data storage capacity and may include any of the computer-readable media described herein. Mass storage device 508 may be used to store programs, data and the like and is typically a secondary storage medium such as a hard disk. It will be appreciated that the information retained within the mass storage device 508, may, in appropriate cases, be incorporated in standard fashion as part of primary storage 506 as virtual memory. A specific mass storage device such as a CD-ROM 514 may also pass data uni-directionally to the CPU.

CPU 502 is also coupled to an interface 510 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 502 optionally may be coupled to an external device such as a database or a computer or telecommunications network using an external connection as shown generally at 512. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store representational information regarding one or more of the following: user news service account or subscription information, search information, articles, article semantic features, cluster information, article feature vectors, age and thresholds, statistics regarding articles and classification, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method of clustering news stories that are to be accessed over a computer network, comprising:
   obtaining a plurality of news articles via the computer network;
   clustering the news articles into a plurality of initial clusters;
   for a subset of the news articles in the initial clusters that are less than a predetermined age limit and any unclustered news articles that are less than the predetermined age limit, determining whether to form one or more new clusters or assign to the initial clusters in an incremental clustering process; and storing indications of the initial clusters and the one or more new clusters, if any, so as to be accessible for sending a portion of the news articles to users in a clustered format based on the initial clusters and the one or more new clusters, if any;

wherein the news articles that are less than the predetermined age limit are defined as transient articles and the remaining news articles are defined as fixed articles, wherein the incremental clustering is withheld from being performed on the fixed articles so that the fixed articles retain their initial clusters;

wherein the incremental clustering process is performed by:

for each transient article, finding one or more nearest neighbor articles from the entire corpus of articles, including fixed and transient articles;

for each transient article selected from a randomly ordered set, determining whether a ratio of nearest neighbors that are fixed articles to nearest neighbors that are transient articles is greater than a predetermined threshold; and for each transient article selected from the randomly ordered set and based on the determination as to whether the ratio is greater than the predetermined threshold, adding such transient article and its one or more nearest neighbors that are transient articles to one or more of the initial clusters or forming a new cluster for such transient article and its one or more nearest neighbors that are transient articles.

2. The method of claim 1, wherein the predetermined age limit is about four hours.

3. The method of claim 1, wherein one or more nearest neighbors are found for each transient articles using a locality sensitive hashing technique.

4. The method of claim 1, wherein the incremental clustering process further includes removing each transient article and its nearest neighbors from the randomly ordered set of news articles prior to clustering a next transient article from such randomly ordered set.

5. The method of claim 1, further comprising recursively reclustering the entire corpus of news articles so as to find a lowest cost clustering after a predetermined time period.

6. The method of claim 1, further comprising:
forming one or more new clusters including at least a portion of the subset of the news articles in the initial clusters.

7. An apparatus comprising at least a processor and a memory, wherein the processor and/or memory are configured to perform operations, comprising:

obtaining a plurality of news articles via the computer network;

clustering the news articles into a plurality of initial clusters;

for a subset of the news articles in the initial clusters that are less than a predetermined age limit and any unclustered news articles that are less than the predetermined age limit, determining whether to form one or more new clusters or assign to the initial clusters in an incremental clustering process; and storing indications of the initial clusters and the one or more new clusters, if any, so as to be accessible for sending a portion of the news articles to users in a clustered format based on the initial clusters and the one or more new clusters, if any;

wherein the news articles that are less than the predetermined age limit are defined as transient articles and the remaining news articles are defined as fixed articles, wherein the incremental clustering is withheld from being performed on the fixed articles so that the fixed articles retain their initial clusters;

wherein the incremental clustering process is performed by:

for each transient article, finding one or more nearest neighbor articles from the entire corpus of articles, including fixed and transient articles;

for each transient article selected from a randomly ordered set, determining whether a ratio of nearest neighbors that are fixed articles to nearest neighbors that are transient articles is greater than a predetermined threshold; and for each transient article selected from the randomly order set and based on the determination as to whether the ratio is greater than the predetermined threshold, adding such transient article and its one or more nearest neighbors that are transient articles to one or more of the initial clusters or forming a new cluster for such transient article and its one or more nearest neighbors that are transient articles.

8. The apparatus of claim 7, wherein the predetermined age limit is about four hours.

9. The apparatus of claim 7, wherein one or more nearest neighbors are found for each transient article using a locality sensitive hashing technique.

10. The apparatus of claim 7, wherein the incremental clustering process further includes removing each transient article and its nearest neighbors from the randomly ordered set of news articles prior to clustering a next transient article from such randomly ordered set.

11. The apparatus of claim 7, wherein the processor and/or memory are further configured to recursively recluster the entire corpus of news articles so as to find a lowest cost clustering after a predetermined time period.

12. The apparatus of claim 7, wherein determining whether to form one or more new clusters or assign to the initial clusters in an incremental clustering process comprises:

determining whether to form one or more new clusters including at least a portion of the subset of the news articles in the initial clusters.

13. The apparatus of claim 7, wherein the processor and/or memory are configured to perform operations, further comprising:

forming one or more new clusters including at least a portion of the subset of the news articles in the initial clusters.

14. At least one non-transitory computer readable storage medium having computer program instructions stored thereon that are arranged to perform operations, comprising:

obtaining a plurality of news articles via the computer network;

clustering the news articles into a plurality of initial clusters;

for a subset of the news articles in the initial clusters that are less than a predetermined age limit and any unclustered news articles that are less than the predetermined age limit, determining whether to form one or more clusters or assign to the initial clusters in an incremental clustering process; and storing indications of the initial clusters and the one or more new clusters, if any, so as to be accessible for sending a portion of the news articles to users in a clustered format based on the initial clusters and the one or more new clusters, if any;

wherein the news articles that are less than the predetermined age limit are defined as transient articles and the remaining news articles are defined as fixed articles, wherein the incremental clustering is withheld from being performed on the fixed articles so that the fixed articles retain their initial clusters;

wherein the incremental clustering process is performed by:

for each transient article, finding one or more nearest neighbor articles from the entire corpus of articles, including fixed and transient articles;

for each transient article selected from a randomly ordered set, determining whether a ratio of nearest neighbors that are fixed articles to nearest neighbors that are transient articles is greater than a predetermined threshold; and for each transient article selected from the randomly order set and based on the determination as to whether the ratio is greater than the predetermined threshold, adding such transient article and its one or more nearest neighbors that are transient articles to one or more of the initial clusters or forming a new cluster for such transient article and its one or more nearest neighbors that are transient articles.

15. The at least one computer readable storage medium of claim 14, wherein the predetermined age limit is about four hours.

16. The at least one computer readable storage medium of claim 14, wherein one or more nearest neighbors are found for each transient articles using a locality sensitive hashing technique.

17. The at least one computer readable storage medium of claim 14, wherein the incremental clustering process further includes removing each transient article and its nearest neighbors from the randomly ordered set of news articles prior to clustering a next transient article from such randomly ordered set.

18. The method of claim 1, wherein determining whether to form one or more new clusters or assign to the initial clusters in an incremental clustering process comprises:

determining whether to form one or more new clusters including at least a portion of the subset of the news articles in the initial clusters.

19. The at least one computer readable storage medium of claim 14, wherein determining whether to form one or more new clusters or assign to the initial clusters in an incremental clustering process comprises:

determining whether to form one or more new clusters including at least a portion of the subset of the news articles in the initial clusters.

20. The at least one computer readable storage medium of claim 14, the computer program instructions stored thereon being arranged to perform operations, further comprising:

forming one or more new clusters including at least a portion of the subset of the news articles in the initial clusters.

\* \* \* \* \*